(12) United States Patent
Ito

(10) Patent No.: US 8,711,432 B2
(45) Date of Patent: Apr. 29, 2014

(54) IMAGE PROCESSING DEVICE, PRINTING APPARATUS, IMAGE PROCESSING METHOD, AND METHOD OF PRODUCING PRINTING APPARATUS

(75) Inventor: Takashi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 132 days.

(21) Appl. No.: 13/495,270

(22) Filed: Jun. 13, 2012

(65) Prior Publication Data

US 2012/0320393 A1 Dec. 20, 2012

(30) Foreign Application Priority Data

Jun. 14, 2011 (JP) ................................. 2011-131871

(51) Int. Cl.
*H04N 1/60* (2006.01)
(52) U.S. Cl.
USPC ............................. 358/1.9; 358/2.1; 358/3.23
(58) Field of Classification Search
None
See application file for complete search history.

(56) References Cited

U.S. PATENT DOCUMENTS

| | | | |
|---|---|---|---|
| 2002/0163640 A1* | 11/2002 | Masuda ......................... | 356/402 |
| 2004/0233463 A1* | 11/2004 | Hersch et al. .................. | 358/1.9 |
| 2005/0094169 A1 | 5/2005 | Berns et al. | |
| 2005/0094871 A1 | 5/2005 | Berns et al. | |
| 2006/0193018 A1 | 8/2006 | Ito et al. | |
| 2007/0030505 A1 | 2/2007 | Ito et al. | |
| 2008/0246982 A1 | 10/2008 | Kaneko et al. | |
| 2009/0185231 A1 | 7/2009 | Hoshii et al. | |
| 2009/0185232 A1 | 7/2009 | Hoshii et al. | |
| 2009/0195845 A1 | 8/2009 | Hoshii et al. | |
| 2009/0213392 A1 | 8/2009 | Hoshii et al. | |
| 2009/0213434 A1 | 8/2009 | Ito et al. | |
| 2010/0134550 A1 | 6/2010 | Ito et al. | |
| 2011/0102859 A1* | 5/2011 | Sasaki ........................... | 358/448 |
| 2011/0249280 A1 | 10/2011 | Ito et al. | |
| 2012/0033263 A1* | 2/2012 | Rich et al. .................... | 358/3.06 |

FOREIGN PATENT DOCUMENTS

| | | |
|---|---|---|
| JP | 2006-261819 A | 9/2006 |
| JP | 2007-511161 A | 4/2007 |
| JP | 2008-230048 A | 10/2008 |
| JP | 2008-230049 A | 10/2008 |
| JP | 2008-230050 A | 10/2008 |
| JP | 2009-033239 A | 2/2009 |
| JP | 2009-164709 A | 7/2009 |
| JP | 2009-169941 A | 7/2009 |
| JP | 2009-171555 A | 7/2009 |
| JP | 2009-171556 A | 7/2009 |
| JP | 2009-177789 A | 8/2009 |
| JP | 2009-188657 A | 8/2009 |

(Continued)

*Primary Examiner* — Kimberly A Williams
(74) *Attorney, Agent, or Firm* — Maschoff Brennan

(57) ABSTRACT

An image processing device performs an image process on image data and outputs printing image data to a printing apparatus which performs printing using special luster ink having special luster, and the image processing device includes: an input unit that inputs the image data; a specification unit that specifies an ink amount set that is combination of ink amounts of inks used in printing by the printing apparatus on the basis of color information and luster degree information of the input image data; and an output unit that outputs the printing image data for printing based on the specified ink amount set to the printing apparatus, wherein the image data includes the color information that is information representing a color of an image and the luster degree information that is information representing a degree of luster of the image based on spectrum reflectances at a plurality of angles.

14 Claims, 10 Drawing Sheets

(56) References Cited

FOREIGN PATENT DOCUMENTS

| | | |
|---|---|---|
| JP | 2009-200820 A | 9/2009 |
| JP | 2009-207098 A | 9/2009 |
| JP | 2009-230739 A | 10/2009 |
| JP | 4355964 B2 | 11/2009 |
| JP | 4388553 B2 | 12/2009 |
| JP | 2010-052208 A | 3/2010 |
| JP | 2010-136022 A | 6/2010 |
| JP | 2010-141830 A | 6/2010 |
| JP | 2010-141831 A | 6/2010 |
| JP | 2010-141832 A | 6/2010 |
| JP | 2010-147586 A | 7/2010 |
| JP | 2010-221437 A | 10/2010 |
| JP | 2010-221438 A | 10/2010 |
| JP | 2010-245966 A | 10/2010 |
| JP | 4582310 B2 | 11/2010 |
| JP | 4595734 B2 | 12/2010 |
| JP | 2011-223298 A | 11/2011 |
| JP | 2011-223345 A | 11/2011 |
| JP | 2011-223392 A | 11/2011 |
| JP | 2011-223434 A | 11/2011 |

* cited by examiner

FIG. 8A

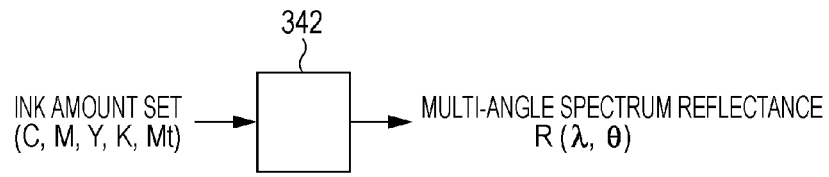

FIG. 8B $$R(\lambda, \theta, i) = Rc(\lambda, ic) \cdot Rm(\lambda, \theta, im) / Rw(\lambda)$$

|  | DIFFUSION REFLECTANCE IN INK AMOUNT SET OF COLOR INK | MULTI-ANGLE SPECTRUM REFLECTANCE OF METALLIC SINGLE COLOR | DIFFUSION REFLECTION OF PRINTING MEDIUM |
|---|---|---|---|
| ACTUAL MEASUREMENT | MEASURE DIFFUSION REFLECTANCE OF COLOR PATCH IN INK AMOUNT SET OF PREDETERMINED NUMBER OF COLOR INK | MEASURE MULTI-ANGLE SPECTRUM REFLECTANCE OF METALLIC PATCH IN INK AMOUNT OF METALLIC INK OF SEVERAL GRADATIONS | MEASURE DIFFUSION REFLECTANCE OF PRINTING MEDIUM |
| ESTIMATION | ESTIMATE DIFFUSION REFLECTANCE IN INK AMOUNT SET OF ARBITRARY COLOR INK BY CYNSN MODEL | ESTIMATE MULTI-ANGLE SPECTRUM REFLECTANCE IN ARBITRARY METALLIC INK AMOUNT BY INTERPOLATION CALCULATION | |

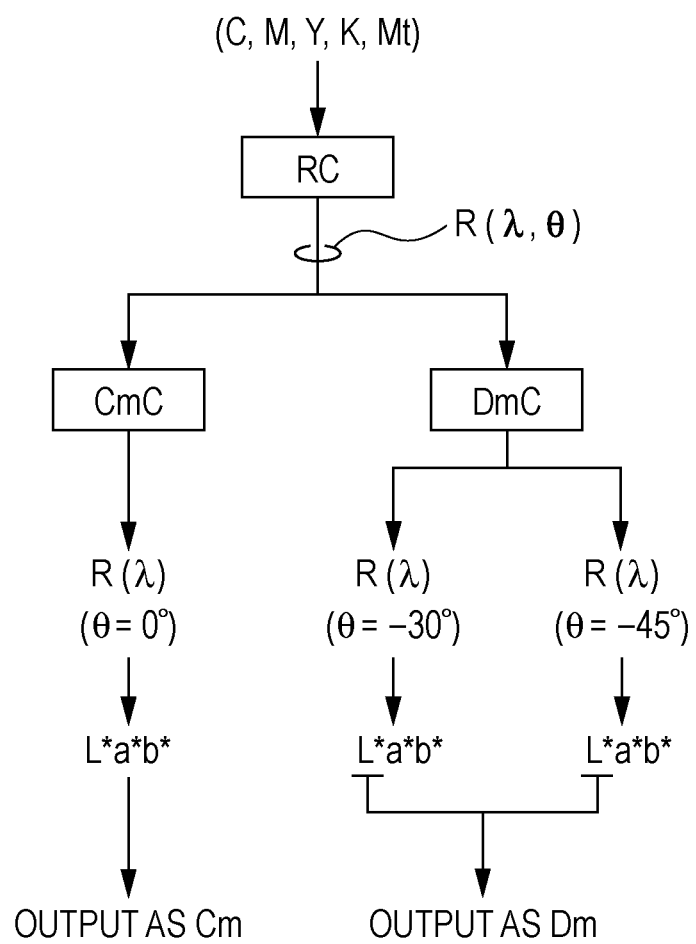

IMAGE PROCESSING DEVICE, PRINTING APPARATUS, IMAGE PROCESSING METHOD, AND METHOD OF PRODUCING PRINTING APPARATUS

CROSS REFERENCES TO RELATED APPLICATIONS

The present invention contains subject matter related to Japanese Patent Application No. 2011-131871 filed in the Japanese Patent Office on Jun. 14, 2011, the entire contents of which are incorporated herein by reference.

BACKGROUND

1. Technical Field

The present invention relates to an image processing device, and more particularly, to an image processing device which performs an image process on image data representing a printing target image and outputs the image-processed image data to a printing apparatus, and a printing technique relating thereto.

2. Related Art

Hitherto, there has been a demand for reproducing special luster such as metal luster and gloss of a printing target with high precision in a print image. For example, JP-A-2006-261819 discloses a technique in which a color and a luster feeling of a printing target having special luster are recorded as image data with separate parameters, and are reflected to a print image. Since visibility of the luster feeling is different according to various view angles, there is also a demand for reproducing such characteristics with high precision.

SUMMARY

An advantage of some aspects of the invention is to reproduce a luster feeling of special luster in a print image with high precision.

The invention can be realized in the following forms or application examples.

Application Example 1

According to an aspect of the invention, there is provided an image processing device which performs an image process on image data representing an image and outputs printing image data to a printing apparatus which performs printing using special luster ink having special luster, the image processing device including: an input unit that inputs the image data; a specification unit that specifies an ink amount set that is combination of ink amounts of inks used in printing by the printing apparatus on the basis of color information and luster degree information of the input image data; and an output unit that outputs the printing image data for printing based on the specified ink amount set to the printing apparatus, wherein the image data includes the color information that is information representing a color of an image and the luster degree information that is information representing a degree of luster of the image based on spectrum reflectances at a plurality of angles.

According to the image processing device, the ink amount sets are specified on the basis of the luster degree information with respect to the image data including the luster degree information based on the spectrum reflectances from the plurality of angles of the image, and thus it is possible to perform the image process of reproducing the degree of luster of the image with high precision.

Application Example 2

In the image processing device according to Application Example 1, the specification unit may have ink amount set specification data that is data generated on the basis of the color information and the luster degree information calculated from multi-angle spectrum reflectances that are the spectrum reflectances at the plurality of angles of images represented by a predetermined number of ink amount sets to uniformly specify the ink amount sets with respect to the color information and the luster degree information, and may perform the specifying on the basis of the ink amount set specification data.

According to the image processing device, the specification unit performs the specifying of the ink amount sets on the basis of the ink amount set specification data generated on the basis of the color information and the luster degree information calculated from the multi-angle spectrum reflectances of the images represented by the predetermined number of ink amount sets, and thus it is possible to specify the ink amount sets reproducing the color and the luster feeling in the special luster regulated by the color information and the luster degree information with high precision.

Application Example 3

In the image processing device according to Application Example 2, the ink amount set specification data may be a multi-dimensional table in which the ink amount sets are stored in grid points determined by the color information and the luster degree information.

According to the image processing device, the specification unit performs the specifying of the ink amount sets using the multi-dimensional table, and thus it is possible to specify the ink amount sets by a relatively simple and easy process.

Application Example 4

In the image processing device according to Application Example 3, the multi-dimensional table may be a look-up table generated by storing the ink amount sets at the grid points, using the multi-angle spectrum reflectances measured for print images of a predetermined number of sample ink amount sets formed of ink amount sets different from each other and a calculation unit that calculates a color of an image and a degree of luster of the image from the multi-angle spectrum reflectances.

According to the image processing device, the multi-dimensional table is the look-up table generated on the basis of the multi-angle spectrum reflectances measured actually using the print image, and thus the ink amount sets stored at the grid points reproduce the color and the luster feeling in the special luster determined by the color information and the luster degree information of the image with high precision. Accordingly, the image processing device can reproduce the color and the degree of luster of the special luster of the image data with high precision to perform the image process.

Application Example 5

In the image processing device according to Application Example 4, the look-up table may be a look-up table generated by storing the ink amount sets at the grid points, further using a model that is generated on the basis of the predetermined number of sample ink amount sets and the measured multi-angle spectrum reflectances and associates an arbitrary ink amount set with the multi-angle spectrum reflectances of the arbitrary ink amount set, and an evaluation function in which a color of an image and a degree of luster of the image are evaluation factors.

According to the image processing device, the ink amount sets are stored at the grid points of the look-up table using the model and the evaluation function, and thus the specification unit can specify the ink amount sets corresponding to the color information and the luster degree information with high precision.

Application Example 6

In the image processing device according to Application Example 3, the ink amount set specification data may be a function of uniformly specifying the ink amount sets on the basis of the color information and the luster degree information.

According to the image processing device, the ink amount specification data is the function, and thus it is possible to reduce storage capacity necessary as the specification unit.

Application Example 7

According to another aspect of the invention, there is provided a printing apparatus including: the image processing device according to any one of Application Example to Application Example 6; and a printing performing unit that performs printing on the basis of the printing image data.

According to the printing apparatus, the ink amount sets are specified on the basis of the luster degree information with respect to the image data including the luster degree information based on the spectrum reflectances from the plurality of angles of the image, and thus it is possible to perform the printing of reproducing the degree of luster of the image with high precision.

Application Example 8

According to still another aspect of the invention, there is provided an image processing method of performing an image process on image data representing an image and outputting printing image data to a printing apparatus, the image processing method including: inputting the image data; specifying an ink amount set that is a combination of ink amounts of inks used in printing by the printing apparatus on the basis of color information and luster degree information of the input image data; and outputting the printing image data for printing based on the specified ink amount set to the printing apparatus, wherein the image data includes the color information that is information representing a color of an image and the luster degree information that is information representing a degree of luster of the image based on spectrum reflectances at a plurality of angles.

According to the image processing method, the ink amount sets are specified on the basis of the luster degree information with respect to the image data including the luster degree information based on the spectrum reflectances from the plurality of angles of the image, and thus it is possible to perform the image process of reproducing the degree of luster of the image with high precision.

Application Example 9

According to still another aspect of the invention, there is provided a method of producing a printing apparatus using a look-up table for converting a special luster color represented using special luster into an ink amount set that is combination of a plurality of ink amounts including a special luster ink having special luster, the method including: acquiring print images of sample ink amount sets formed of a predetermined number of ink amount sets; measuring multi-angle spectrum reflectances that are spectrum reflectances at a plurality of angles of the acquired print images; generating the look-up table by storing ink amount sets at grid points of the look-up table in which a color of the special luster and a degree of luster of the special luster are taken on axes, using the measured multi-angle spectrum reflectance and a calculation unit that calculates the color of the special luster color and the degree of luster of the special luster from the multi-angle spectrum reflectance; and associating the generated look-up table with the printing apparatus.

According to the method of producing the printing apparatus, it is possible to produce the printing apparatus in which the look-up table storing the ink amount sets reproducing the color of the special luster and the degree of the special luster at the grid points are stored.

Application Example 10

According to still another aspect of the invention, there is provided a method of generating a look-up table for converting a special luster color represented using special luster into an ink amount set that is combination of a plurality of ink amounts including a special luster ink having special luster, the method including: acquiring print images of sample ink amount sets formed of a predetermined number of ink amount sets; measuring multi-angle spectrum reflectances that are spectrum reflectances at a plurality of angles of the acquired print images; and storing ink amount sets at grid points of the look-up table in which a color of the special luster and a degree of luster of the special luster are taken on axes, using the measured multi-angle spectrum reflectance and a calculation unit that calculates the color of the special luster color and the degree of luster of the special luster from the multi-angle spectrum reflectance.

According to the method of generating the look-up table, it is possible to store the ink amount sets reproducing the color of the special luster and the degree of the special luster at the grid points.

Application Example 11

In the method of generating the look-up table according to Application Example 10, the storing of the ink amount sets may include: generating a model of associating arbitrary ink amount sets with multi-angle spectrum reflectances of the arbitrary ink amount sets on the basis of the predetermined number of ink amount sets and the measured multi-angle spectrum reflectances; and determining and storing the ink amount sets stored at the grid points, using the model, the calculation unit, and an evaluation function in which a color of the special luster and a degree of the special luster are evaluation factors.

According to the method of generating the look-up table, it is possible to improve precision of the ink amount sets stored at the grid points. That is, it is possible to store the ink amount sets reproducing the color of the special luster and the degree of the special luster with high precision, at the grid points.

BRIEF DESCRIPTION OF THE DRAWINGS

The invention will be described with reference to the accompanying drawings, wherein like numbers reference like elements.

FIG. 8A and FIG. 8B are diagrams illustrating a multi-angle spectrum printing model converter.

FIG. 9 is a diagram illustrating a metallic degree value converter and a metallic color value converter.

DESCRIPTION OF EXEMPLARY EMBODIMENTS

Embodiments of the invention will be described on the basis of the examples.

A. First Example

A1. System Configuration

Figure 1:
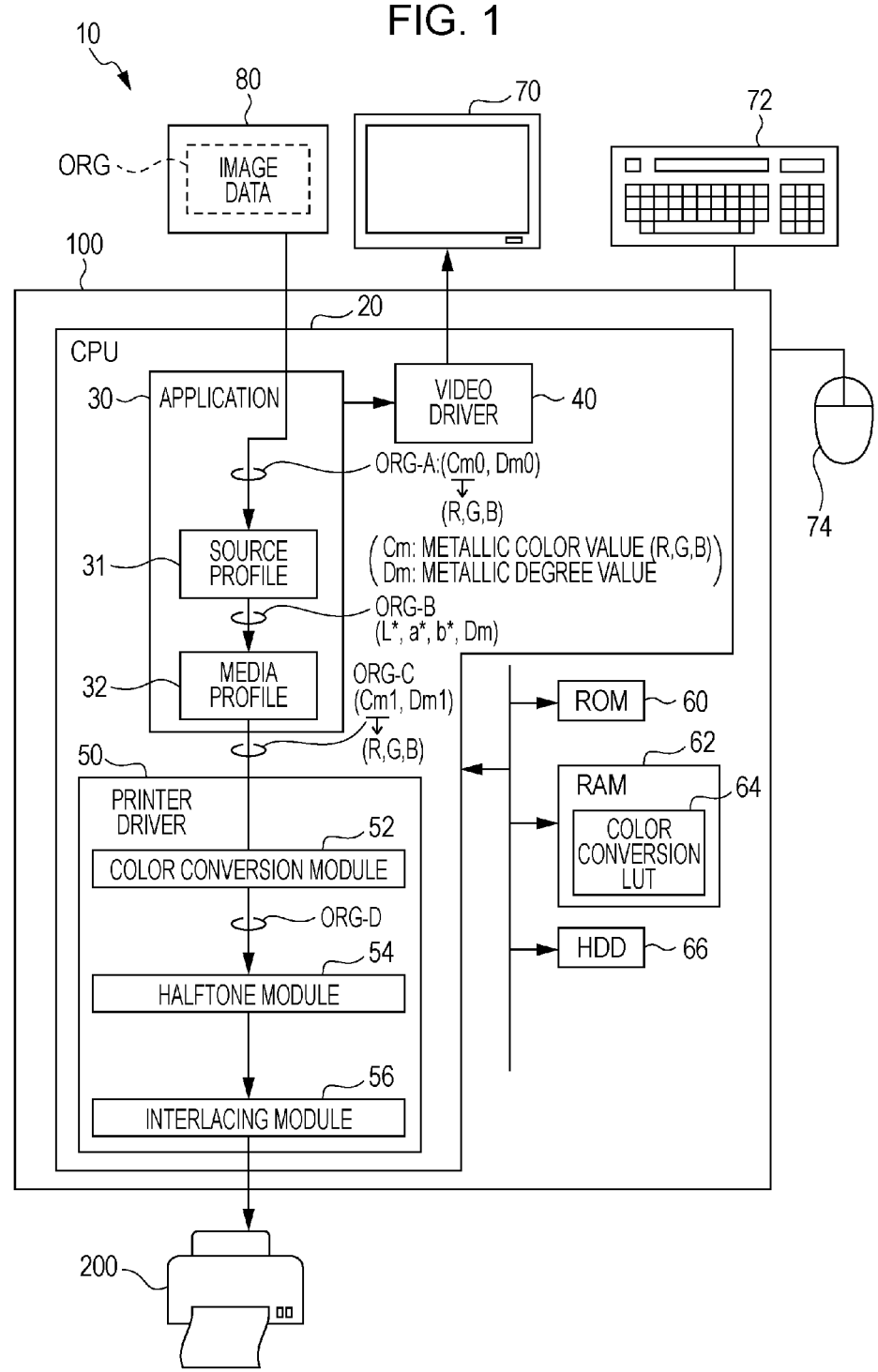
FIG. 1 is a diagram illustrating a schematic configuration of a printing system.

FIG. 1 is a diagram illustrating a schematic configuration of a printing system 10 as a first example of the invention. The printing system 10 includes a computer 100 as a printing control device, and a printer 200 that actually prints an image under a control of the computer 100. The printing system 10 is formed of one body overall, and serves as a broad-sense printing apparatus.

The computer 100 includes a CPU 20, a ROM 60, a RAM 62, and a hard disk (HDD) 66. The computer 100 is connected to a display 70, a keyboard 72, and a mouse 74 by cables. In the computer 100, a predetermined operating system is installed, and an application program 30, a video driver 40, and a printer driver 50 operate under the operating system. Functions of such programs are stored in the ROM 60 or RAM 62 and the HDD 66, and the CPU 20 reads each program from such a storage area and executes the program, thereby realizing the function.

The application program 30 is a program for reproducing image data ORG acquired from a memory card as a data supply unit 80. In pixel data of pixels constituting the image data ORG, color values (hereinafter, also referred to as metallic color values Cm) on metal luster in which colors of the pixels are pre-defined, and degree values (hereinafter, also referred to as metallic degree values Dm) of the metal luster are recorded. The metallic color values Cm are recorded as gradation values of red (R), green (G), and blue (B), and the metallic degree values Dm are scalar amounts and are recorded as gradation values. Hereinafter, such values may be summarized to represent the values by color component values (Cm and Dm) or (R, G, B, and Dm) of the pixels. Details of the image data ORG will be described later.

The application program 30 reads a source profile 31 for converting the color component value of the image data ORG into a preset printing standard color and a media profile 32 for reproducing a color of a printing target image on a predetermined printing medium, from the HDD 66 to the RAM 62.

When the printing process to be described later is started, the application program 30 performs data conversion on the acquired image data ORG using the source profile 31 and the media profile 32. Hereinafter, for convenience of description, the image data ORG input from the data supply unit 80 may be represented by image data ORG-A, the image data ORG after the data conversion using the source profile 31 may be represented by image data ORG-B, and the image data ORG after the data conversion using the media profile 32 may be represented by image data ORG-C.

The source profile 31 is a 3-dimensional look-up table outputting values of one set (L*, a*, and b*) with respect to one set (R, G, and B) of metallic color values among the color component values (R, G, B, and Dm) of the image data ORG-A. The metallic degree value Dm remains even after the data conversion using the source profile 31, and is recorded in the image data. That is, the color component values of the pixel data of the image data ORG-B after the data conversion using the source profile 31 are recorded in a form of (L*, a*, b*, and Dm).

The media profile 32 is a 3-dimensional look-up table outputting one set (R, G, and B) of color component values with respect to one set (L*, a*, and b*) of color component values among the color component values (L*, a*, b*, and Dm) of the image data ORG after the conversion using the source profile 31. The metallic degree value Dm remains even after the data conversion using the media profile 32, and is recorded in the pixel data. That is, the color component values of the pixel data of the image data ORG after the data conversion using the media profile 32 are recorded in a form of (R, G, B, and Dm). Hereinafter, the color component values of the image data ORG-A may be called (Cm0 and Dm0), and the color component values of image data ORG-C may be called (Cm1 and Dm1).

The printer driver 50 includes a color conversion module 52, a halftone module 54, and an interlacing module 56. The color conversion module 52 converts the color component values (R, G, B, and Dm) of the pixel data of the image data ORG-C acquired from the application program 30 into combination (hereinafter, also referred to as ink amount set) of ink amounts of ink colors provided in the printer 200 using a color conversion look-up table 64 (hereinafter, also referred to as a color conversion LUT 64) provided in the RAM 62. The color conversion look-up table 64 is stored in the ROM 60, the RAM 62, or a storage unit of the HDD 66 at the time of producing the printing system 10. The color conversion LUT 64 will be described later in detail.

The halftone module 54 performs a binarization process on the ink amount set after the color conversion, and performs a generating process (hereinafter, also referred to as a halftone process) of dot data. Specifically, the halftone module 54 generates dot data represented by on/off of dots, with respect to image data ORG (hereinafter, also referred to as image data ORD-D) subjected to the color conversion and represented by the ink amount set, using a dither matrix (not shown) previously prepared in the printer driver 50. By the halftone module 54, the image data ORG represented by the gradation of the ink amount becomes data represented by distribution of dots. The interlacing module 56 sorts lines of the dots of the generated dot data in order of transmission to the printer 200, outputs the dot data as printing data to the printer 200, and outputs various commands such as a printing start command and a printing end command to the printer 200, thereby controlling the printer 200.

Figure 2:
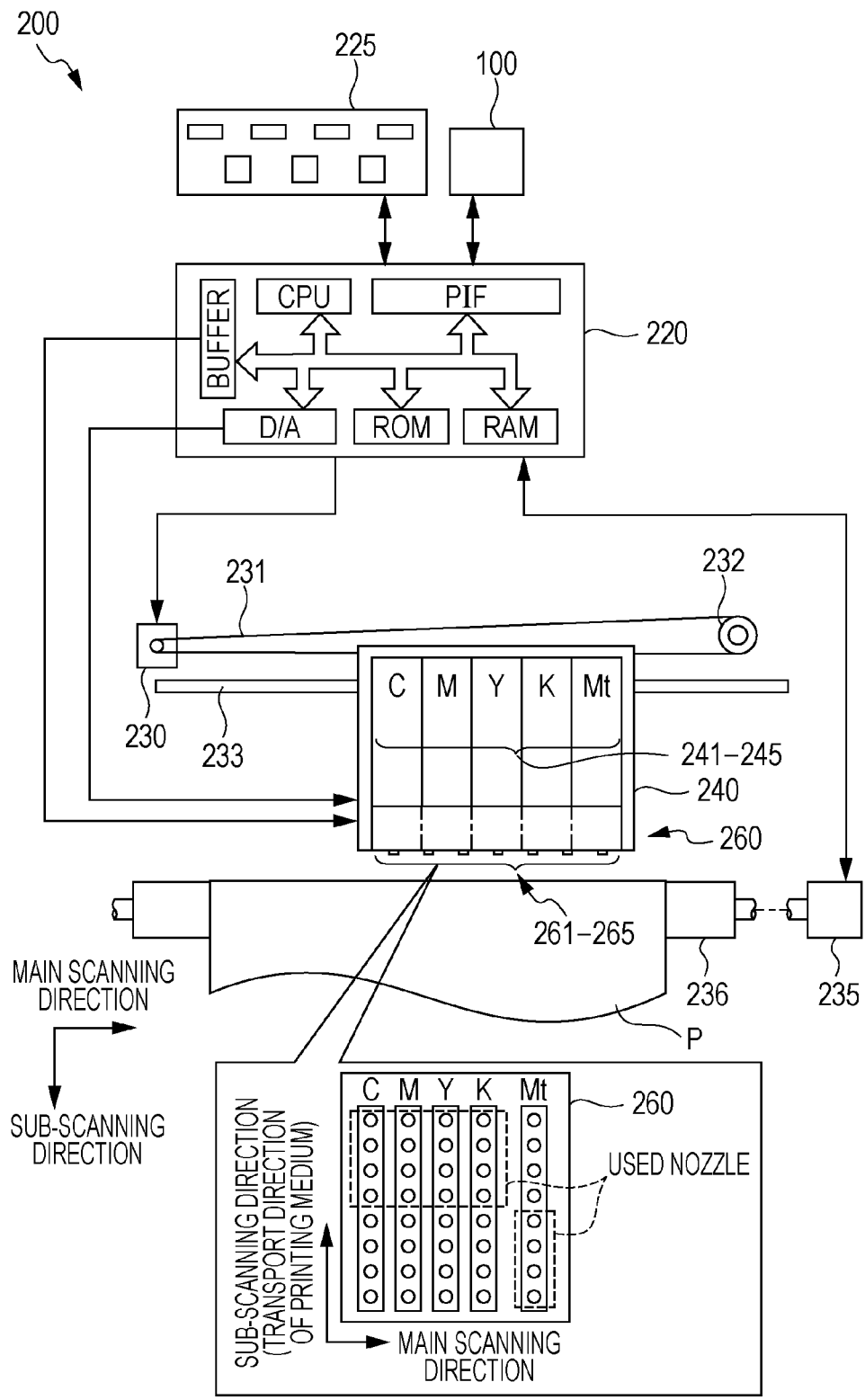
FIG. 2 is a diagram illustrating a configuration of a printer.

FIG. 2 is a diagram illustrating a configuration of the printer 200. As shown in FIG. 2, the printer 200 includes a control circuit 220 that controls the whole of the printer 200 and receives the printing data from the computer 100, and an operation panel 225. The printer 200 further includes a mechanism that transports a printing medium P by a paper transport motor 235, a mechanism that reciprocates a carriage 240 in an axial direction of a platen 236 by a carriage motor 230, a mechanism that drives a printing head 260 mounted on the carriage 240 to perform ejection of ink and formation of dots, the paper transport motor 235, the carriage motor 230, and the printing head 260.

The control circuit 220 is configured by connecting a CPU, a ROM, a RAM, and PIF (peripheral device interface) to each other by a bus, and controls operations of the carriage motor 230 and the paper transport motor 235 to thereby control a main scanning operation and a sub-scanning operation of the carriage 240. When the printing data output from the computer 100 through the PIF is received, the control circuit 220 supplies a driving signal corresponding to the printing data to the printing head 260 according to main scanning or sub-scanning movement of carriage 240, to drive the head of each color.

The carriage 240 is provided with ink cartridges 241 to 245 in which inks of five colors in total formed of metallic ink having metal luster (hereinafter, also referred to as Mt) in addition to the color inks of C (cyan), M (magenta), Y (yellow), and K (black) are accommodated, respectively. The printing head 260 under the carriage 240 are provided with five kinds of nozzle rows 261 to 265 corresponding to the inks of the colors described above. When the ink cartridges 241 to 245 are mounted on the carriage 240 from the upside, it is possible to supply the inks from the cartridges to the nozzle rows 261 to 265. In the example, as shown in FIG. 2, the ink cartridges 241 to 245 are arranged in order of C, M, Y, K, and Mt in the main scanning direction of the carriage 240. Each nozzle may be provided with a piezoelectric element, the control circuit 220 controls contraction movement of the piezoelectric element, and thus the printer 200 forms dots for the ink colors.

When the printing is performed using such inks (C, M, Y, K, and Mt), as shown in the drawing, the printing is performed using the last half part in the sub-scanning direction of the nozzle rows 261 to 264 ejecting the color inks and the first half part in the sub-scanning direction of the nozzle rows 265 ejecting the metallic ink. The dots of the metallic ink (Mt) are first formed on the printing medium P using the nozzle rows as described above, the dots of the color inks are formed thereon, and thus it is possible to represent metal luster of various color tones to a print image.

Hereinafter, details of the metallic ink will be described. The metallic ink is an ink exhibiting a metallic feeling, and for example, an oily ink composition material including a metal pigment, an organic solvent, and resin may be used as such a metallic ink. To effectively cause a visually metallic feeling, the metal pigment described above is preferably flat-shaped particles, it is preferable that a 50% average particle diameter R50 of a circle corresponding diameter acquired from an area of an X-Y plane of the flat-shaped particle be 0.5 to 3 μm when a long diameter on the plane of the flat-shaped particles is X, a short diameter is Y, and a thickness is Z, and it is preferable to satisfy a condition of R50/Z>5.

Such a metal pigment may be formed by, for example, aluminum or aluminum alloy, and may be produced by fracturing a metal vapor-deposited film. Concentration of the metal pigment included in the metallic ink may be, for example, 0.1 to 10.0 weight %. Of course, the metallic ink is not limited to such a composition, and may appropriately employ the other composition if the composition is a composition of causing the metallic feeling. In the example, the composition of the metallic ink includes 1.5 weight % of an aluminum pigment, 20 weight % of glycerin, 40 weight % of triethylene glycol monobutyl ether, and 0.1 weight % of BYK-UV3500 (manufactured by BYK-Chemie Japan Co., Ltd.).

A2. Printing Process

Figure 3:
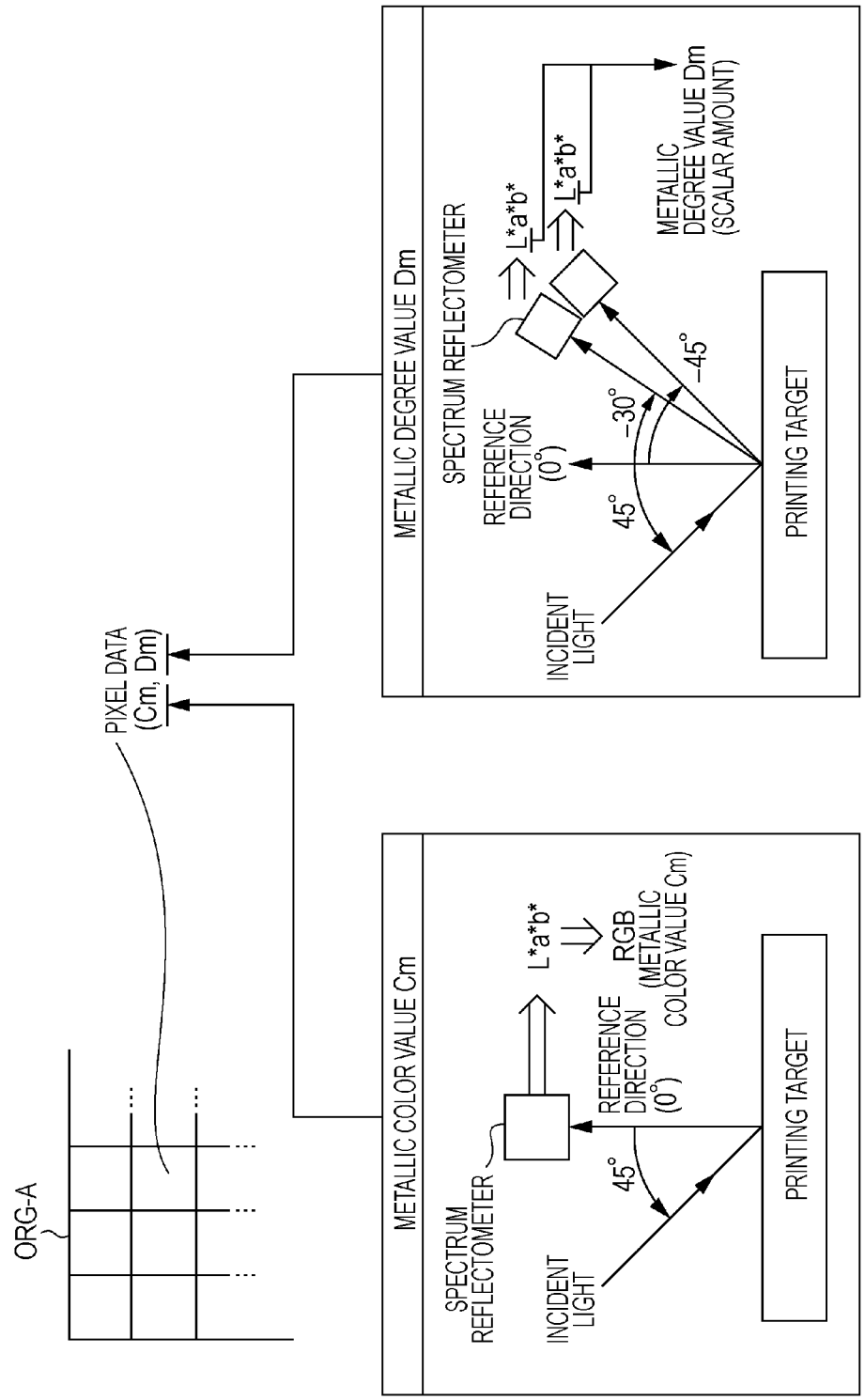
FIG. 3 is a diagram illustrating image data ORG-A.

Next, the printing process performed on the image data ORG by the printing system 10 will be described. First, the image data ORG-A acquired from the data supply unit 80 by the printing system 10 will be described. FIG. 3 is a diagram illustrating the image data ORG-A. As described above, the component value of the color of the pixel data of the image data ORG-A is regulated by the metallic color value Cm and the metallic degree value Dm. The metallic color value Cm is a measured color value of a printing target that is a target of printing in a specific direction (angle). For example, as shown in FIG. 3, the printing target is irradiated with incident light using a light source at an incidence angle of θ=45° on the basis of a vertical direction (hereinafter, also referred to as a reference direction) with respect to a face (hereinafter, also referred to as a color measurement face) of the printing target of color measurement, a spectrum reflectance (diffusion reflectance) of reflection light at a reflection angle of θ=0° is measured, and the measured spectrum reflectance is converted into L*a*b* using a color-matching function and is converted into RGB by a predetermined conversion formula. The value (R, G, and B) after the conversion is the metallic color value.

Meanwhile, the metallic degree value Dm is a value based on the spectrum reflectance (multi-angle spectrum reflectance) of the printing target at a plurality of reflection angles (measurement angles of spectrum reflectance) with respect to the reference direction (θ=0°). For example, the printing target is irradiated with the incident light at the incidence angle of θ=45° with respect to the reference direction, and the spectrum reflectances at the plurality of angles such as reflection angles θ=−30° and −45° are measured. Thereafter, the spectrum reflectances are converted into L*a*b* using the color-matching function in the same method as the method described above. The metallic degree value Dm as a scalar amount is specified by a predetermined method, from each brightness value "L*" (hereinafter, the brightness values at the reflection angles may be referred to as L*(−30°) or L*(−45°)) of the L*a*b* after the conversion. As a method of regulating correspondence between the plurality of brightness values L* and the metallic degree value Dm as one scalar amount, for example, the correspondence between the brightness value L* (for example, L*(−30°) and L(−45°)) and the metallic degree value Dm is constructed by an experiment using a patch (also referred to as a metallic patch) as a color sample in which the metallic ink Mt is printed with respect to a plurality of steps of ink amounts, and the other correspondence between the brightness value L* and the metallic degree value Dm is calculated and regulated by interpolation. As described above, the image data ORG-A is regulated. In the image data ORG-A, the color component values are regulated as (R, G, B, and Dm). Accordingly, when there is an area of a predetermined color which does not have metal luster in the printing target, the color component value corresponding to the area in the image data ORG-A may be recorded as Dm=0.

In the example, the metallic degree value Dm as a scalar amount is specified from L*(−30°) or L*(−45°), but the metallic degree value Dm may be regulated as a vector amount formed of L*(−30°) or L*(−45°) and may be applied to the printing system 10.

In the example, the metallic color value Cm and the metallic degree value Dm are measured using a spectrum reflectometer and is recorded as the image data, but for example, the multi-angle reflection light of the printing target may be received using a mirror or a plurality of CCDs (Charge Coupled Device Image Sensors), and the metallic color value Cm and the metallic degree value Dm of the printing target may be recorded as the image data using a scanner capable of measuring the multi-angle spectrum reflectance of the printing target.

Figure 4:
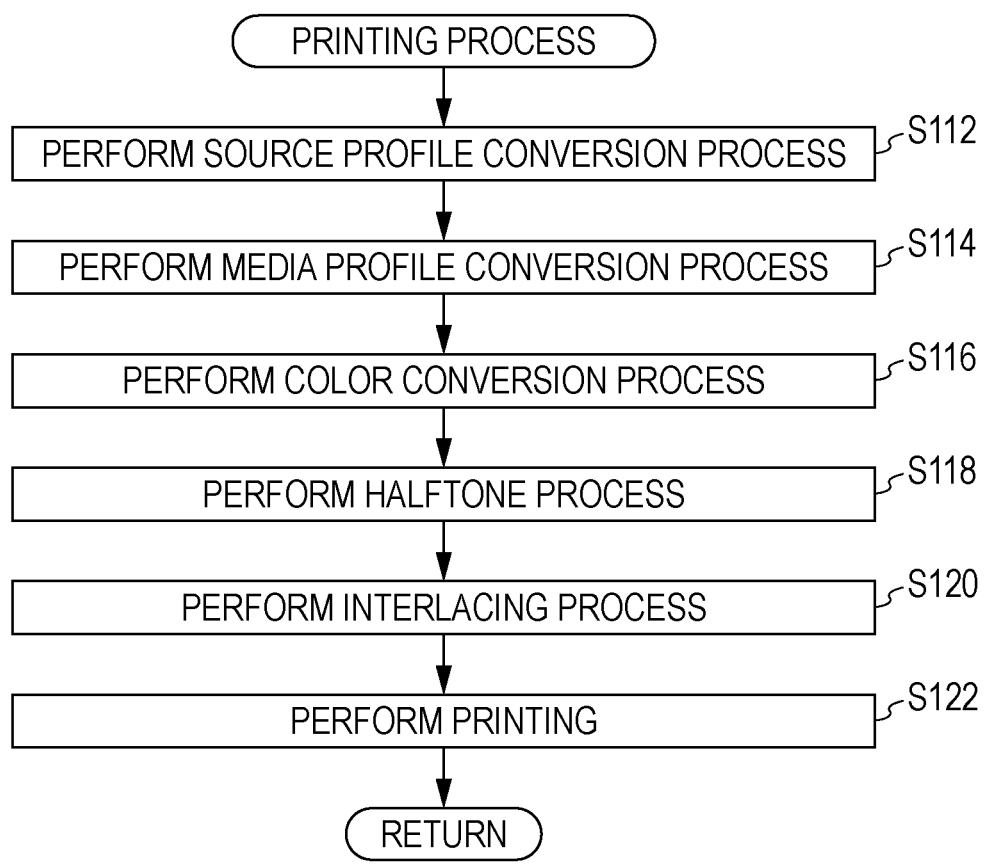
FIG. 4 is a flowchart illustrating a flow of a printing process.

Next, a flow of the printing process performed by the CPU 20 will be described. FIG. 4 is a flowchart illustrating the flow of the printing process. The printing process is started when a user instructs printing on the application program 30. When the printing process is started, the CPU 20 performs data conversion (source profile conversion) of the image data ORG-A recorded in the color component values (R, G, B, and Dm) into the image data ORG-B regulated by the color component values (L*, a*, b*, and Dm) using the source profile as a function of the application program 30 (Step S112). Thereafter, the CPU 20 performs data conversion (media profile conversion) of the image data ORG-B regulated by the color component values (L*, a*, b*, and Dm) into the image data ORG-C regulated by the color component values (R, G, B, and Dm) using the media profile 32 (Step S114). That is, by the application program 30, the values (R, G, and B) of the metallic color value Cm of the image data ORG-A recorded as the color component values (Cm and Dm) is adjusted according to a printing standard color and a printing medium, and the color component values of the image data ORG-C output from the application program 30 are also the form of (Cm and Dm).

After performing the media profile conversion, the CPU 20 performs color conversion of the color component values (R, G, B, and Dm) of the image data ORG-C into the ink amount sets (C, M, Y, K, and Mt) regulated by the ink amounts of C, M, Y, K, and Mt provided in the printer 200 using the color conversion LUT 64 as a function of the color conversion module (Step S116). Hereinafter, the data of the ink amount sets is also referred to as ink amount data.

The color conversion look-up table 64 is a 4-dimensional look-up table configured from four axes of R, G, B, and Dm, and the ink amount sets (C, M, Y, K, and Mt) are stored at the grid points. (R, G, and B) that are the axes of the color conversion look-up table 64 represent, that is, (R, G, and B) as the color values on metal luster in the metallic color value Cm. The ink amount sets (C, M, Y, K, and Mt) adjusted to represent the metal luster feeling determined by the metallic color value Cm and the metallic degree value Dm recorded in the image data ORG-A are stored at the grid points of the color conversion look-up table 64. The ink amounts C, M, Y, K, and Mt are regulated by gradations of 0 to 255. The color conversion module 52 performs the color conversion process using the color conversion look-up table 64.

After performing the color conversion process, the CPU 20 performs the halftone process (Step S118) and the interlacing process (Step S120) on the ink amount data, and cause the printer 200 to perform printing (Step S122). As described above, the printing system 10 performs the printing process.

As described above, according to the printing system 10, the degree of luster of the metal luster in the printing target image is regulated using the metallic degree value Dm based on the multi-angle spectrum reflectance. At the time of printing process, in the color conversion process, the ink amount of the metallic ink is specified on the basis of the metallic color value Cm and the metallic degree value Dm of the image data ORG, and thus it is possible to very appropriately reproduce the metal luster in the printing image. Since the (Cm and Dm) of the image data ORG are converted into the ink amount sets using the look-up table in the color conversion process, it is possible to perform the color conversion process as a relatively simple and easy process.

As the color conversion look-up table 64 used in the first example, various look-up tables may be employed if the ink amount sets of (C, M, Y, K, and Mt) adjusted to reproduce the metal luster feeling determined by the metallic color value Cm and the metallic degree value Dm of the image data ORG is stored. For example, a color conversion look-up table 64 generated by a method described in a second example may be employed to be described later.

B. Second Embodiment

B1. Method of Generating Color Conversion LUT 64

Figures 5, 6:
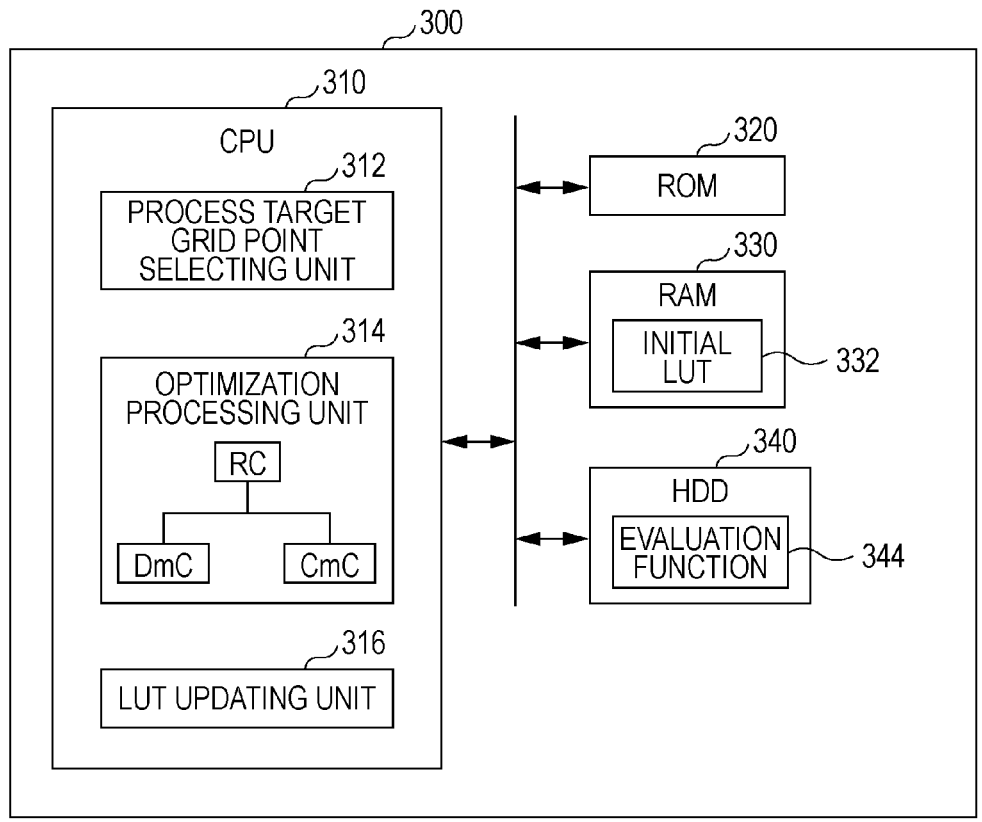
FIG. 5 is a diagram illustrating a configuration of a color conversion LUT generating device.
FIG. 6 is a diagram illustrating a data structure of an initial LUT.

As the second example, an example of a method of generating the color conversion LUT 64 used in the color conversion process (FIG. 4: Step S116) of the first example will be described. The color conversion LUT 64 is generated by a color conversion LUT generating device 300. FIG. 5 is a diagram illustrating a configuration of the color conversion LUT generating device 300. The color conversion LUT generating device 300 is configured as a computer including a CPU 310, a ROM 320, a RAM 330, a hard disk (HDD) 340, a monitor (not shown), and various input/output interfaces (not shown). The CPU 310 includes a process target grid point selecting unit 312, an optimization processing unit 314, and an LUT updating unit 316. The optimization processing unit 314 includes a multi-angle spectrum printing model converter RC, a metallic degree value converter DmC, and a metallic color value converter CmC. The CPU 310 reads the program stored in the ROM 320 to the RAM 330 and executes the program, thereby realizing such processing units. The RAM 330 stores an initial LUT 332. The HDD 340 stores an evaluation function 344.

The color conversion LUT generating device 300 performs an LUT generating process to be described later and optimizes and updates the ink amount sets stored at the grid points of the initial LUT 332, thereby generating the color conversion LUT 64. FIG. 6 is a diagram illustrating a data structure of the initial LUT 332. The initial LUT 332 is provided with the metallic degree values Dm and the metallic color values Cm (R, G, and B) as axes of input values, and the ink amount sets (C, M, Y, K, and Mt) are output values. At the grid points of the initial LUT 332 before the LUT generating process, the ink amount sets (hereinafter, also referred to as initial ink amount sets) before the updating are stored. The initial ink amount sets may be set according to various methods. An ink amount set (representative ink amount set) that is a representative of several sets such as the ink amount sets (C, M, Y, K, and Mt)=(255, 0, 0, 0, 0), (0, 255, 0, 0, 0), (0, 0, 255, 0, 0), (0, 0, 0, 255, 0), and (0, 0, 0, 0, 255) is selected, a color patch as a color sample on which printing is actually performed by the representative ink amount set is created, and measurement of the multi-angle spectrum reflectance of the color patch and calculation using the color-matching function are performed, thereby specifying the metallic color value Cm and the metallic degree value Dm of each representative ink amount set. The corresponding representative ink amount sets are stored at the grid points of the initial LUT 332 corresponding to the specified metallic color values Cm (R, G, and B) and metallic degree value Dm. As described above, the representative ink amount sets are stored at several grid points, and the ink amount sets are stored by a predetermined interpolation calculation on the basis of the grid points at which the representative ink amount sets have been already stored, at the other grid points. In the example, as described above, the initial LUT 332 is created and stored in the RAM 330.

Figure 7:
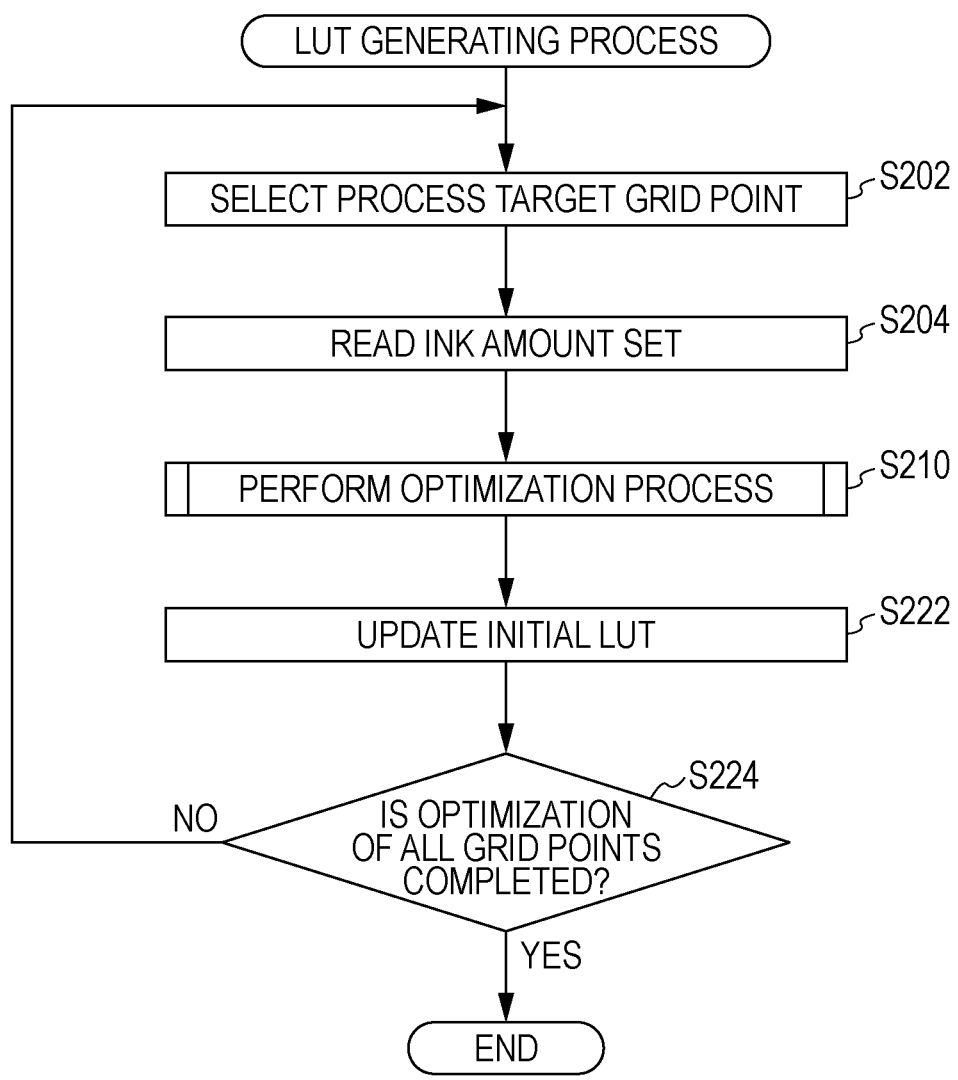
FIG. 7 is a flowchart illustrating a flow of an LUT generating process.

Next, the LUT generating process performed by the CPU 310 will be described. FIG. 7 is a flowchart illustrating a flow of the LUT generating process. When the color conversion LUT generating process is started, the CPU 310 selects a process target grid point that is a target of the process from the initial LUT 332 according to a predetermined sequence as a function of the process target grid point selecting unit 312 (Step S202). The CPU 310 reads the ink amount set stored at the process target grid point (Step S204). Thereafter, the CPU 310 performs an optimization process of adjusting the value of each ink amount of the read ink amount set of the process target grid point to a value of an ink amount satisfying a predetermined condition, as a function of the optimization processing unit 314 (Step S210). At the time of the optimization process, the CPU 310 uses the multi-angle spectrum printing model converter RC, the metallic degree value converter DmC, and the metallic color value converter CmC. The optimization process will be described later in detail.

After the optimization process, the CPU 310 overwrites the ink amount set (hereinafter, also referred to as an optimal ink amount set) in which the values of the ink amounts are optimized, on the process target grid points, thereby updating the initial LUT 332 (Step S222). The CPU 310 performs the optimization and the updating of such ink amount sets in which all the grid points of the initial LUT 332 are the process target grid points (Step S224), and ends the LUT generating process. After the end of the LUT generating process, the initial LUT 332 of the RAM 330 is updated, and the color conversion LUT 64 is generated. As described above, the LUT generating process is performed.

B2. Optimization Process

Next, the optimization process (Step 210) will be described. First, the multi-angle spectrum printing model converter RC, the metallic degree value converter DmC, and the metallic color value converter CmC, which are used in the optimization process, will be described. FIG. 8A and FIG. 8B are diagrams illustrating the multi-angle spectrum printing model converter RC. As shown in FIG. 8A, the multi-angle spectrum printing model converter RC is a converter that converts arbitrary ink amount sets (C, M, Y, K, and Mt) into a multi-angle spectrum reflectance $R(\lambda, \theta)$. In the example, the multi-angle spectrum reflectance $R(\lambda, \theta)$ is defined as follows in the formula (1).

$$R(\lambda,\theta,i)=Rc(\lambda,ic)\cdot Rm(\lambda,\theta,im)/Rw(\lambda) \quad (1)$$

$\lambda$: wavelength element of reflection light
$\theta$: reflection angle element of reflection light
i: ink amount (C, M, Y, K, and Mt) of ink used in printing process
ic: ink amount set (C, M, Y, and K) of color ink
im: ink amount (Mt) of metallic ink In the formula (1), $Rc(\lambda, ic)$ represents a spectrum reflectance (diffusion reflectance: incidence angle $\theta=45°$ and reflection angle $\theta=0°$ of the incident light) of a print image in an ink amount set ic of a color ink. $Rm(\lambda, \theta, im)$ represents a multi-angle spectrum reflectance of the print image in the ink amount im of a metallic ink single color. $Rw(\lambda)$ represents a spectrum reflectance (diffusion reflectance: incidence angle $\theta=45°$ and reflection angle $\theta=0°$ of the incident light) of a background color of a predetermined printing medium, that is, a printing medium used in a printing process.

FIG. 8B is a diagram illustrating a concept of the multi-angle spectrum printing model converter RC. The multi-angle spectrum printing model converter RC is an estimation model of estimating the multi-angle spectrum reflectance $R(\lambda, \theta)$ in arbitrary ink amount sets (C, M, Y, K, and Mt) from $Rc(\lambda, ic)$ in a predetermined number of ink amount sets (C, M, Y, K, and Mt) and an actual measurement value (measurement value) of the $Rm(\lambda, \theta, im)$. When the multi-angle spectrum reflectance $R(\lambda, \theta)$ is estimated, the multi-angle spectrum printing model converter RC separately estimates the spectrum reflectance $Rc(\lambda, ic)$ in the ink amount set of the color ink and the multi-angle spectrum reflectance $Rm(\lambda, \theta, im)$ of the metallic ink, and performs the calculation based on the formula (1) to calculate the multi-angle spectrum reflectance $R(\lambda, \theta)$ from each estimated reflectance.

A method of estimating the spectrum reflectance $Rc(\lambda, ic)$ in the ink amount set of the color ink will be described. First, a color patch is actually printed at a plurality of representative points in an ink amount space of the color inks (C, M, Y, and K), and the diffusion reflectance thereof is measured by the spectrum reflectometer. Estimation based on Cellular Yule-Nielsen Spectral Neugebauer Model (CYNSN) is performed using a database of the diffusion reflectance obtained by the measurement, and to estimate the diffusion reflectance $Rc(\lambda, ic)$ when the printing is performed with the ink amount set (C, M, Y, and K) of an arbitrary color ink. The estimation based on Cellular Yule-Nielsen Spectral Neugebauer Model is the known technique (for example, JP-T-2007-511161), and thus is not described.

A method of estimating the multi-angle spectrum reflectance $Rm(\lambda, \theta, im)$ of the metallic ink will be described. First, the ink amount is changed in several steps, a print image (hereinafter, also referred to as metallic patch) as a color sample of a metallic ink single color in each ink amount is actually printed, and the multi-angle spectrum reflectance of each metallic patch is actually measured (actual measurement) by the spectrum reflectometer. Interpolation calculation (for example, linear interpolation) is performed using a database of the multi-angle spectrum reflectance in the ink amount of each metallic ink obtained by the measurement, to estimate the multi-angle spectrum reflectance $Rm(\lambda, \theta, im)$ when the printing is performed with an ink amount of an arbitrary metallic ink.

$Rw(\lambda)$ that is the spectrum reflectance (diffusion reflectance) of the background color of the printing medium is actually acquired with respect to the printing medium by the spectrum reflectometer. As described above, the multi-angle spectrum printing model converter RC estimates the spectrum reflectance $Rc(\lambda, ic)$ from (C, M, Y, and K) with respect to an input arbitrary ink amount set (C, M, Y, K, and Mt), estimates the multi-angle spectrum reflectance $Rm(\lambda, \theta, im)$ from (Mt), and outputs $R(\lambda, \theta, i)$ represented by the calculation in the formula (1) using the spectrum reflectance $Rw(\lambda)$ of the printing medium acquired in advance by the measurement.

Next, the metallic color value converter CmC and the metallic degree value converter DmC will be described. FIG. 9 is a diagram illustrating the metallic color value converter CmC and the metallic degree value converter DmC. The metallic color value converter CmC acquires the multi-angle spectrum reflectance $R(\lambda, \theta)$ output for the ink amount set (C, M, Y, K, and Mt) by the multi-angle spectrum printing model converter RC, and calculates $R(\lambda)$ at $\theta=0'$. The L*a*b* value is calculated using the calculated $R(\lambda)$ and the color-matching function, and is output as the metallic color value Cm. As described above, the metallic color value recorded in the image data ORG is recorded by a color system of RGB, but the metallic color value Cm recorded by a color system of L*a*b* is used in the optimization process.

Meanwhile, the metallic degree value converter DmC acquires the multi-angle spectrum reflectance $R(\lambda, \theta)$ output for the ink amount set (C, M, Y, K, and Mt) by the multi-angle spectrum printing model converter RC, and calculates the spectrum reflectance $R(\lambda)$ at the reflection angle $\theta=-30°$ and $-45°$, for example, when the metallic degree value Dm is regulated by the spectrum reflectance at two reflection angles $\theta=-30°$ and $-45°$. The L*a*b* values are calculated with respect to the calculated spectrum reflectances $R(\lambda)$ using the color-matching function. Thereafter, the metallic degree value Dm is specified by a predetermined method using L*(−30°) and L*(−45°) of the calculated L*a*b* values. As a method of specifying the metallic degree value Dm as a scalar amount from the plurality of brightness values L*, for example, as described above, the method of specifying the metallic degree value Dm in the image data ORG-A may be used.

Figure 10:
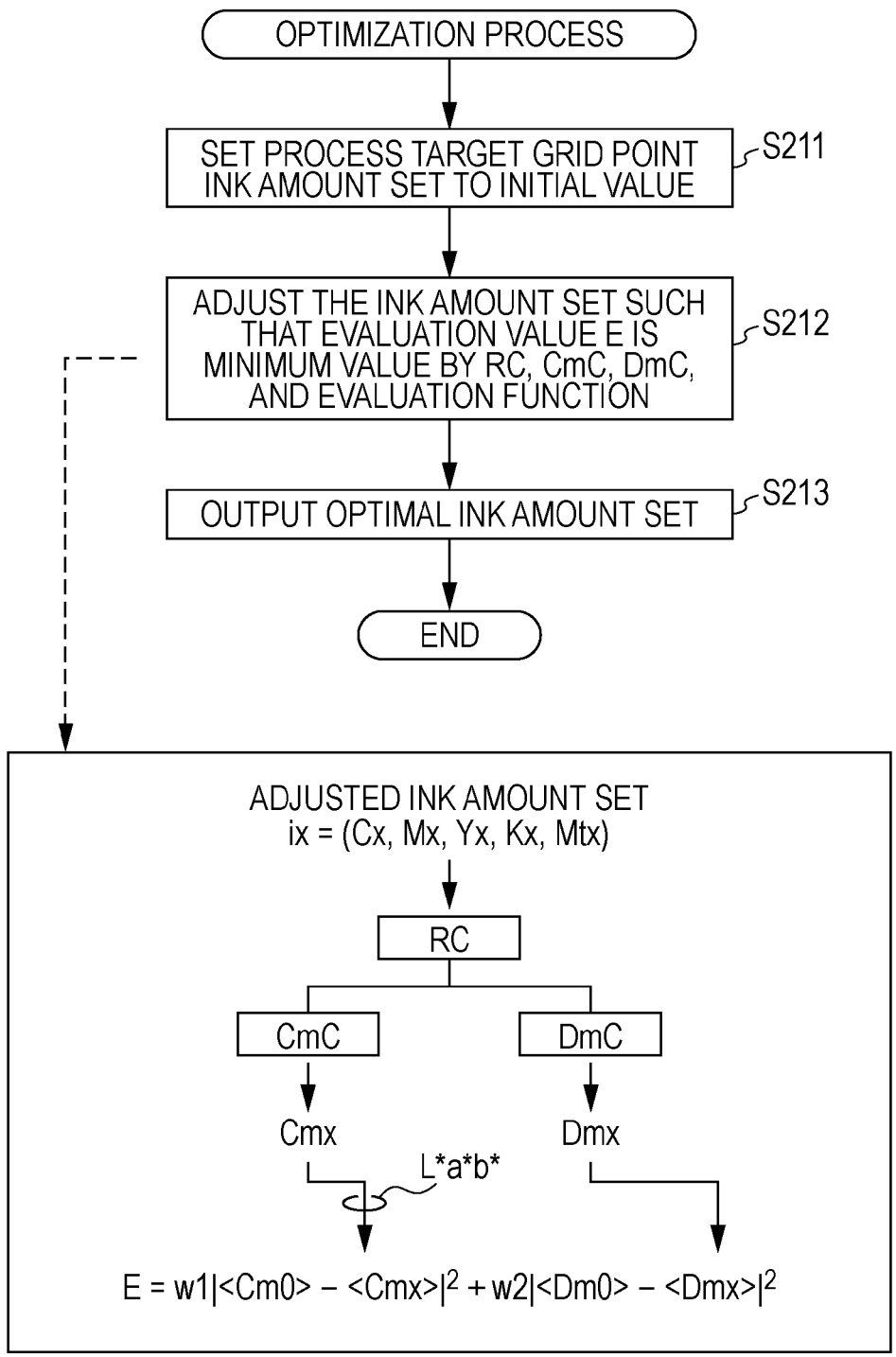
FIG. 10 is a flowchart illustrating a flow of an optimization process.

As described above, the CPU 310 performs the optimization process using the multi-angle spectrum printing model converter RC, the metallic degree value converter DmC, and the metallic color value converter CmC. FIG. 10 is a flowchart illustrating a flow of the optimization process performed by the CPU 310. When the optimization process is started, the CPU 310 sets the ink amount set of the process target grid point read as the LUT generating process (FIG. 7: Step S204), as the initial value (hereinafter, also referred to as an initial ink amount set) of the optimization (Step S211).

As shown at the lower part of FIG. 10, the ink amount values of the initial ink amount set (C, M, Y, K, and Mt) are adjusted such that an evaluation value E is the minimum using the multi-angle spectrum printing model converter RC, the metallic degree value converter DmC, and the metallic color value converter CmC described above, and the evaluation function defined as follows in the formula (2) (Step S212). The ix=(Cx, Mx, Yx, Kx, and Mtx) shown at the lower part of FIG. 10 represents an adjustment ink amount set input to the multi-angle spectrum printing model converter RC at the time of adjusting the ink amount set, and Cmx and Dmx represent the metallic color value Cm (=L*, a*, and b*) and the metallic degree value Dm output through RC, DmC, and CmC with respect to the adjustment ink amount set ix.

$$E = w1|<Cm0>-<Cmx>|^2 + w2|<Dm0>-<Dmx>|^2 \quad (2)$$

In the formula (2), w1 and w2 represent predetermined weight coefficients. In addition, < > means a vector. As Cm0 (L*, a*, and b*) when the values of (R, G, and B) of the process target grid points (R, G, B, and Mt) are converted by the source profile 31 is used. Dm0 as a target value is set by a predetermined method (for example, interpolation based on an experiment and an experiment value), as Dm0. As a method of adjusting the ink amount in which the evaluation value E is the minimum, optimization methods such as a steepest descent method, a Quasi-Newton method, and a simplex method may be employed.

In the example, the formula (2) is employed as the evaluation function, but the other evaluation function of a form of a general formula shown as follows in the formula (3) in which Cmx and Dmx are parameters may be employed. As the evaluation factors of the evaluation function, a term of evaluating a gradation property with the adjacent grid point, a term of evaluating granularity of ink dots, and a term of controlling quality of a print image may be added.

$$E = w1 f_1(Cmx) + w2 f_2(Dmx) \quad (3)$$

As described above, after the adjustment of the ink amounts in the initial ink amount set is performed, the CPU 310 outputs the ink amount set (C, M, Y, K, and Mt) in which the evaluation value E is the minimum, as the optimal ink amount set, and updates the initial LUT 332 using the optimal ink amount set in Step S222 in the LUT generating process (FIG. 7) described above. The optimization process has been described above.

As described above, the color conversion look-up table 64 generated along the method described above determines the ink amount set stored by the optimization using the evaluation function, and thus it is possible to reproduce the metal luster feeling and the color in the metal luster regulated by the metallic color value Cm and the metallic degree value Dm of the image data ORG with high precision. Since the multi-angle spectrum printing model converter RC generated on the basis of the actual measurement value of the spectrum reflectance of the color sample (color patch and metallic patch) is used at the time of the optimization, it is possible to further reproduce the metal luster feeling and the color in the metal luster with high precision.

C. Modification Example

The invention is not limited to the examples and embodiments described above, may be embodied with respect to various aspects in the scope which does not deviate from the main concept, and may be modified, for example, as follows.

C1. Modification Example 1

The multi-angle spectrum printing model converter RC in the example described above estimates $R(\lambda, \theta)$ from the ink amount set (C, M, Y, K, and Mt) using the method described in FIG. 8A and FIG. 8B, that is, the formula (1), but may estimate $R(\lambda, \theta)$ from the ink amount set (C, M, Y, K, and Mt) according to the other method. For example, $R(\lambda, \theta)$ may be estimated by polynomial approximation. As shown as follows in the formula (4), $R(\lambda, \theta)$ is estimated by the polynomial, in which independent variables are the ink amounts C, M, Y, K, and Mt, and a dependent variable is the multi-angle spectrum reflectance.

$$R\lambda\theta = a_{0\lambda\theta} + a_{1\lambda\theta}C + a_{2\lambda\theta}M + a_{3\lambda\theta}Y + a_{4\lambda\theta}K + a_{5\lambda\theta} + a_{7\lambda\theta}C^2 + a_{8\lambda\theta}CM + a_{9\lambda\theta}CY + a_{10\lambda\theta}CK + a_{11\lambda\theta}CMt + a_{12\lambda\theta}M^2 + a_{13\lambda\theta}MY + a_{14\lambda\theta}MK + a_{15\lambda\theta}MMt + a_{17\lambda\theta}Y^2 + a_{18\lambda\theta}YK + a_{19\lambda\theta}YMt + a_{20\lambda\theta}K^2 + a_{21\lambda\theta}KMt + a_{22\lambda\theta}Mt^2 + \ldots \quad (4)$$

In the formula (4), R represents a multi-angle spectrum reflectance, $\lambda$ represents a wavelength component of R, and $\theta$ represents a reflection angle component of R. The coefficients a0 to a22 ... represent coefficients of terms, and the coefficients are determined each for combination of $\lambda$ and $\theta$. The coefficients a0 to a22 ... are determined by a general minimum square method. In the formula (4), the description is given up to the second-order term for the independent variables, and the third-order term and the later are not described, but actually, even the third-order term and the later are also calculated according to necessary precision. Even when $R(\lambda, \theta)$ is estimated from the ink amount set (C, M, Y, K, and Mt) according to such a method, it is possible to very appropriately reproduce the metal luster in the print image similarly to the example described above.

Figure 11:
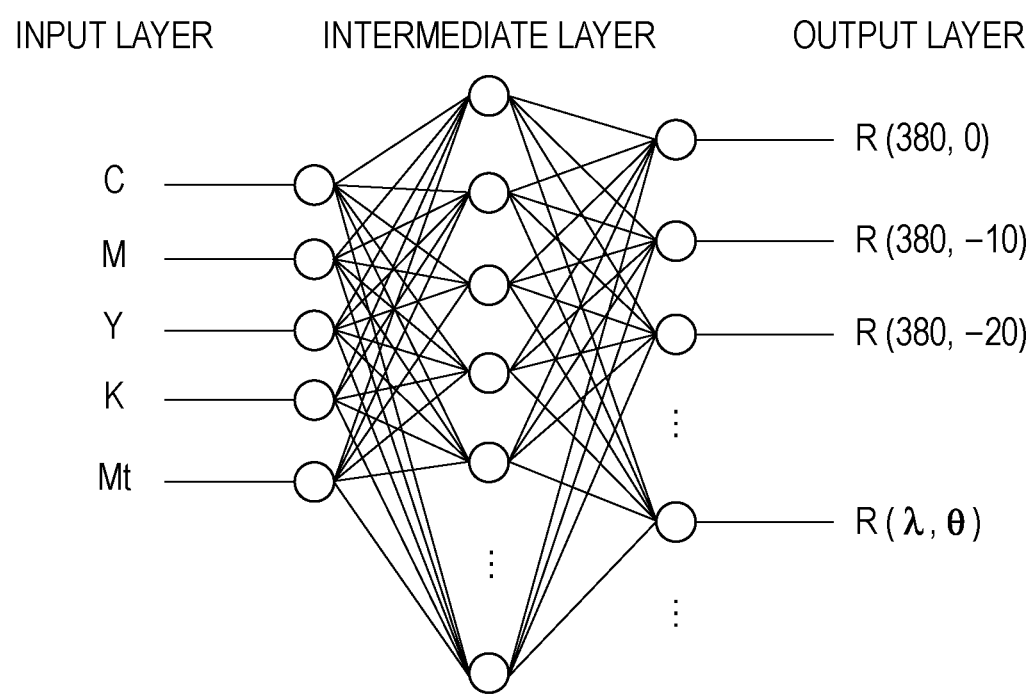
FIG. 11 is a diagram illustrating estimation of multi-angle spectrum reflectance by a neural network.

In addition, $R(\lambda, \theta)$ may be estimated from the ink amount set (C, M, Y, K, and Mt) using a neural network. FIG. 11 is a diagram illustrating the estimation of the multi-angle spectrum reflectance $R(\lambda, \theta)$ based on the neural network. As shown in FIG. 11, it is realized by a 3-layer network, for example, in which an input layer is an ink amount and an output layer is components of the multi-angle reflectance. The neural network may be designed by a general method, and a plurality of inputs xi to nodes (neurons) are converted as follows in the formula (5).

$$y=\psi(\Sigma ai \cdot xi+b) \qquad (5)$$

In the formula, i identifies the input to the neuron, ai represents a weight to each input, and b represents a parameter as a bias. In the formula, ψ represents a transfer function, and linear conversion, a sigmoid function, or the like may be employed. The parameters ai and b are present in the intermediate layer and the output layer, and the parameters are determined by learning such as backpropagation. Even when R(λ, θ) is estimated from the ink amount set (C, M, Y, K, and Mt) according to such a method, it is possible to very appropriately reproduce the metal luster in the print image similarly to the example described above. In addition, it is possible to construct the neural network by a relatively simple and easy process, and thus it is possible to simply and easily generate the multi-angle spectrum printing model converter RC.

C2. Modification Example 2

In the example described above, the color conversion process is performed by the look-up table, but the invention is not limited thereto, and the color conversion process may be performed by a predetermined function in which (Cm and Dm) that are the color component values of the image data ORG are parameters. Even in such a manner, it is possible to very appropriately reproduce the metal luster in the print image similarly to the example described above.

C3. Modification Example 3

In the example described above, C, M, Y, and K are employed as the color inks provided in the printing apparatus, but for example, it is possible to expand the printing system 10 in the example by employing light cyan (Lc), light magenta (Lm), and the like. In addition, it is possible to expand the printing system 10 using inks of orange (Or), green (G), and the like for expand the area of colors producible in printing.

C4. Modification Example 4

In the example described, the configuration of performing the printing by the metallic ink and the color inks is employed, but a configuration using the color ink and various special luster inks may be employed. The special luster ink is an ink representing special luster on a printing medium surface subjected to printing, and may be an ink representing various visual methods according to a view angle in which optical characteristics of the ink printed on the printing medium surface haves reflection angle dependency, in addition to the metallic ink containing a pigment exhibiting a metallic feeling. In addition to the metallic ink, the ink may be, specifically, a pearl luster ink containing a pigment exhibiting a pearl luster feeling after fixing onto the medium surface, and a lame ink or a ground ink containing a pigment having minute unevenness to cause diffuse reflection after fixing on the medium surface to exhibit a so-called lame feeling or ground feeling. In addition, special luster inks for reproducing texture such as a clear ink for reproducing gloss and a gold ink having gold color may be employed and may be applied to the printing system 10. As described above, it is possible to reproduce various textures.

C5. Modification Example 5

In the example described above, as the metallic degree value Dm in the image data ORG-A, the scalar amount specified from the multi-angle spectrum reflectance of the printing target is employed, but the image data ORG in which the metallic ink amount (Mt) is recorded as it is, for example, Mt of the image data ORG recorded as (R, G, B, and Mt) may be analyzed with the metallic degree value Dm as it is or may be analyzed with the metallic degree value Dm by predetermined conversion, thereby performing the printing process.

C6. Modification Example 6

The color conversion process using the color conversion look-up table 64 described above may be variously realized. For example, the created color conversion look-up table 64 may be stored in the storage unit (for example, ROM) provided in the printer 200, and the printer 200 may perform the color conversion process using the color conversion look-up table 64. As another configuration, similarly to the example described above, the created color conversion look-up table 64 may be stored in the storage unit (for example, hard disk, ROM, or RAM) of a computer or the like capable of communicating with the printing apparatus, and the image data subjected to the color conversion process by the computer may be transmitted to the printing apparatus. As still another configuration, the color conversion look-up table 64 is not stored in the storage unit of the printing apparatus or the computer and may be stored in a server or the like, and a configuration in which the color conversion look-up table 64 can be recognized and used in the printer 200 with the storing may be employed.

What is claimed is:

1. An image processing device which performs an image process on image data representing an image and outputs printing image data to a printing apparatus which performs printing using special luster ink having special luster, the image processing device comprising:
    an input unit that inputs the image data;
    a specification unit that specifies an ink amount set that is combination of ink amounts of inks used in printing by the printing apparatus on the basis of color information and luster degree information of the input image data; and
    an output unit that outputs the printing image data for printing based on the specified ink amount set to the printing apparatus,
    wherein the image data includes the color information that is information representing a color of an image and the luster degree information that is information representing a degree of luster of the image based on spectrum reflectances at a plurality of angles.

2. The image processing device according to claim 1, wherein the specification unit has ink amount set specification data that is data generated on the basis of the color information and the luster degree information calculated from multi-angle spectrum reflectances that are the spectrum reflectances at the plurality of angles of images represented by a predetermined number of ink amount sets to uniformly specify the ink amount sets with respect to the color information and the luster degree information, and performs the specifying on the basis of the ink amount set specification data.

3. The image processing device according to claim 2, wherein the ink amount set specification data is a multi-dimensional table in which the ink amount sets are stored in grid points determined by the color information and the luster degree information.

4. The image processing device according to claim 3, wherein the multi-dimensional table is a look-up table generated by storing the ink amount sets at the grid points, using the multi-angle spectrum reflectances measured for print images of a predetermined number of sample ink amount sets formed of ink amount sets different from each other and a calculation unit that calculates a color of an image and a degree of luster of the image from the multi-angle spectrum reflectances.

5. The image processing device according to claim 4, wherein the look-up table is a look-up table generated by storing the ink amount sets at the grid points, further using a model that is generated on the basis of the predetermined number of sample ink amount sets and the measured multi-angle spectrum reflectances and associates an arbitrary ink amount set with the multi-angle spectrum reflectances of the arbitrary ink amount set, and an evaluation function in which a color of an image and a degree of luster of the image are evaluation factors.

6. The image processing device according to claim 3, wherein the ink amount set specification data is a function of uniformly specifying the ink amount sets on the basis of the color information and the luster degree information.

7. A printing apparatus comprising:
the image processing device according to claim 1; and
a printing performing unit that performs printing on the basis of the printing image data.

8. A printing apparatus comprising:
the image processing device according to claim 2; and
a printing performing unit that performs printing on the basis of the printing image data.

9. A printing apparatus comprising:
the image processing device according to claim 3; and
a printing performing unit that performs printing on the basis of the printing image data.

10. A printing apparatus comprising:
the image processing device according to claim 4; and
a printing performing unit that performs printing on the basis of the printing image data.

11. A printing apparatus comprising:
the image processing device according to claim 5; and
a printing performing unit that performs printing on the basis of the printing image data.

12. A printing apparatus comprising:
the image processing device according to claim 6; and
a printing performing unit that performs printing on the basis of the printing image data.

13. An image processing method of performing an image process on image data representing an image and outputting printing image data to a printing apparatus, the image processing method comprising:
inputting the image data;
specifying an ink amount set that is combination of ink amounts of inks used in printing by the printing apparatus on the basis of color information and luster degree information of the input image data; and
outputting the printing image data for printing based on the specified ink amount set to the printing apparatus,
wherein the image data includes the color information that is information representing a color of an image and the luster degree information that is information representing a degree of luster of the image based on spectrum reflectances at a plurality of angles.

14. A method of producing a printing apparatus using a look-up table for converting a special luster color represented using special luster into an ink amount set that is combination of a plurality of ink amounts including a special luster ink having special luster, the method comprising:
acquiring print images of sample ink amount sets formed of a predetermined number of ink amount sets;
measuring multi-angle spectrum reflectances that are spectrum reflectances at a plurality of angles of the acquired print images;
generating the look-up table by storing ink amount sets at grid points of the look-up table in which a color of the special luster and a degree of luster of the special luster color are taken on axes, using the measured multi-angle spectrum reflectance and a calculation unit that calculates the color of the special luster color and the degree of luster of the special luster from the multi-angle spectrum reflectance; and
associating the generated look-up table with the printing apparatus.

* * * * *